J. F. APPLEBY.
COTTON BOLL GATHERER.
APPLICATION FILED NOV. 30, 1907.
908,637.
Patented Jan. 5, 1909.
6 SHEETS—SHEET 6.
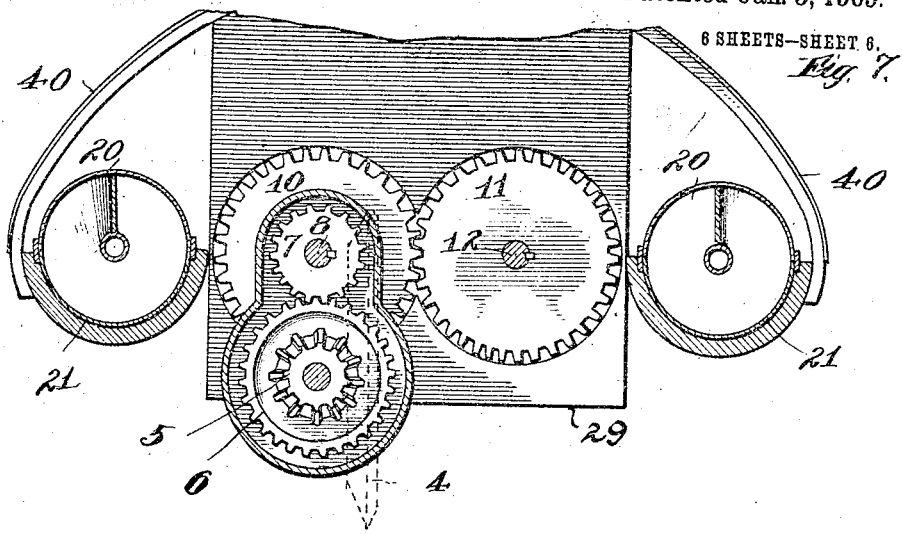
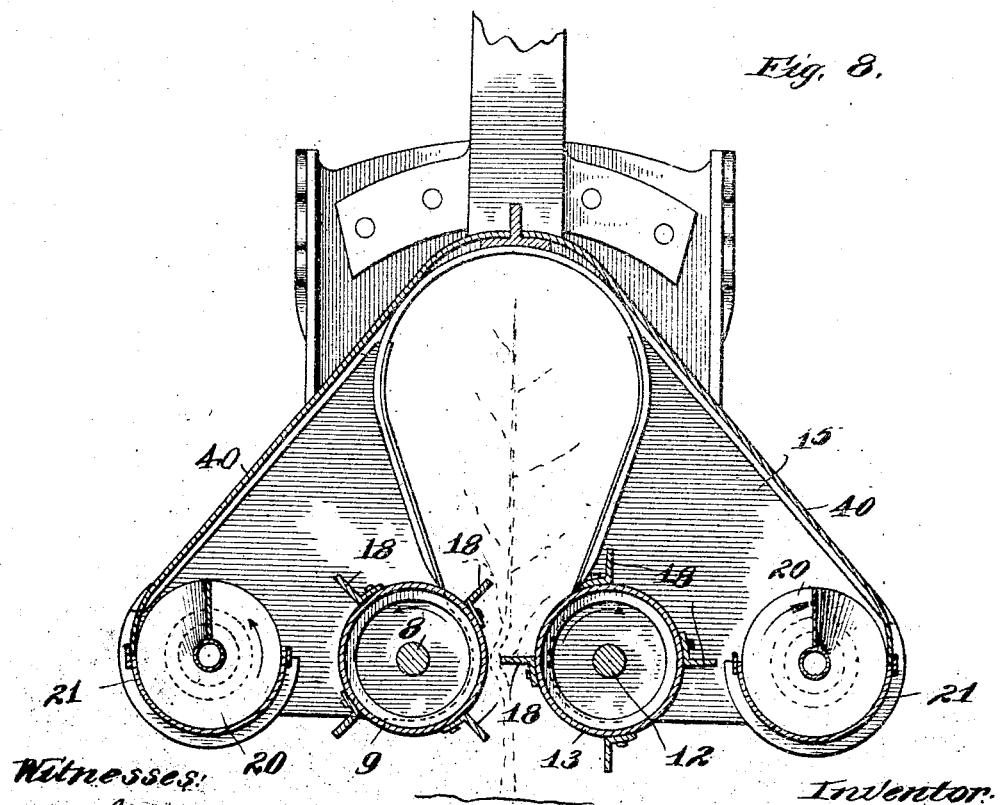
Witnesses:
Inventor:
John F. Appleby,
By G. L. Cragg
Atty

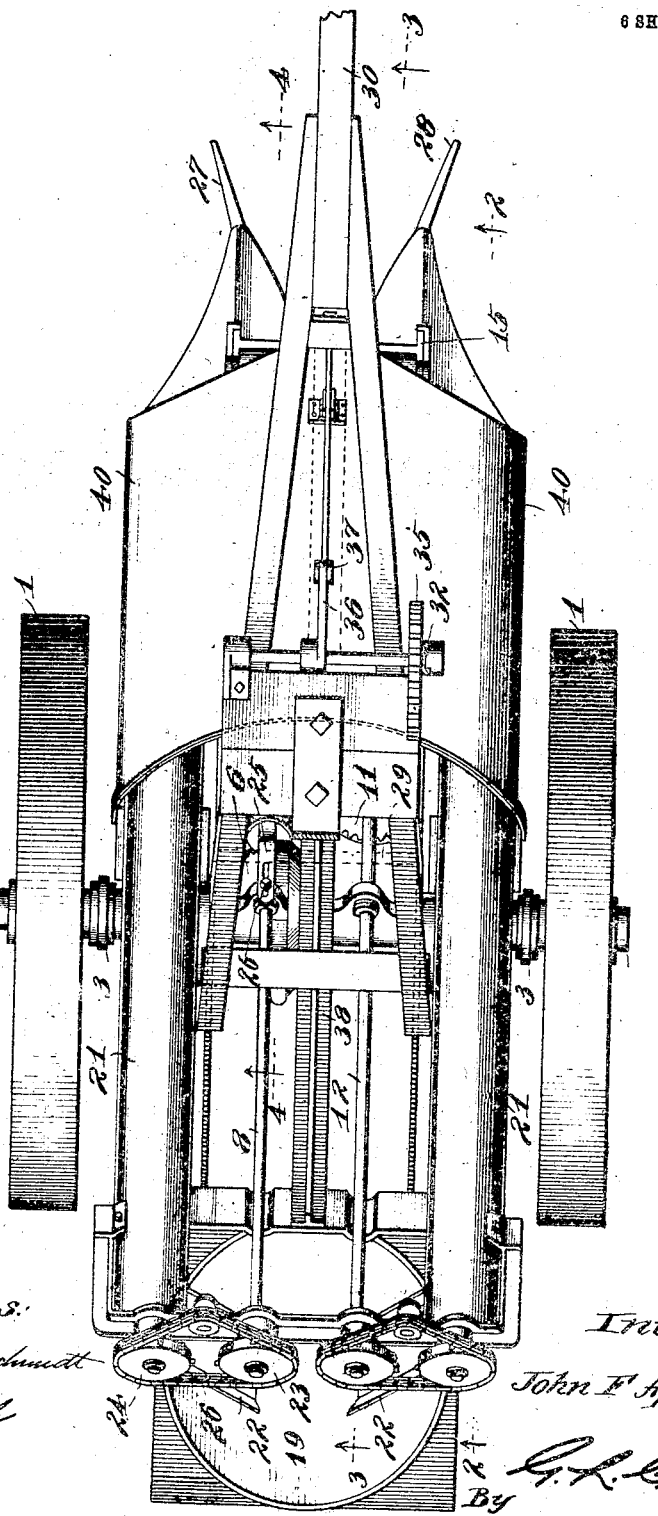

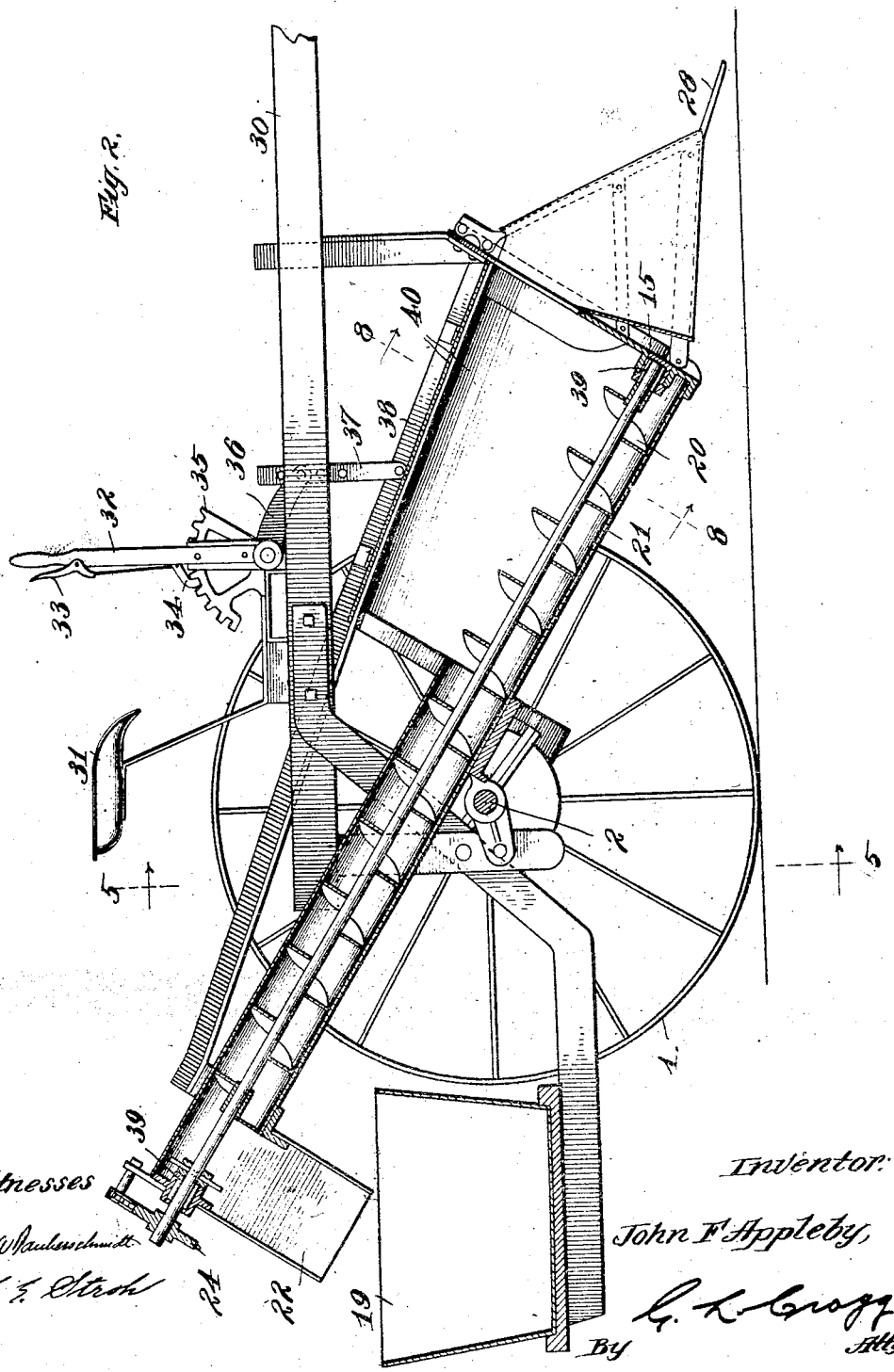

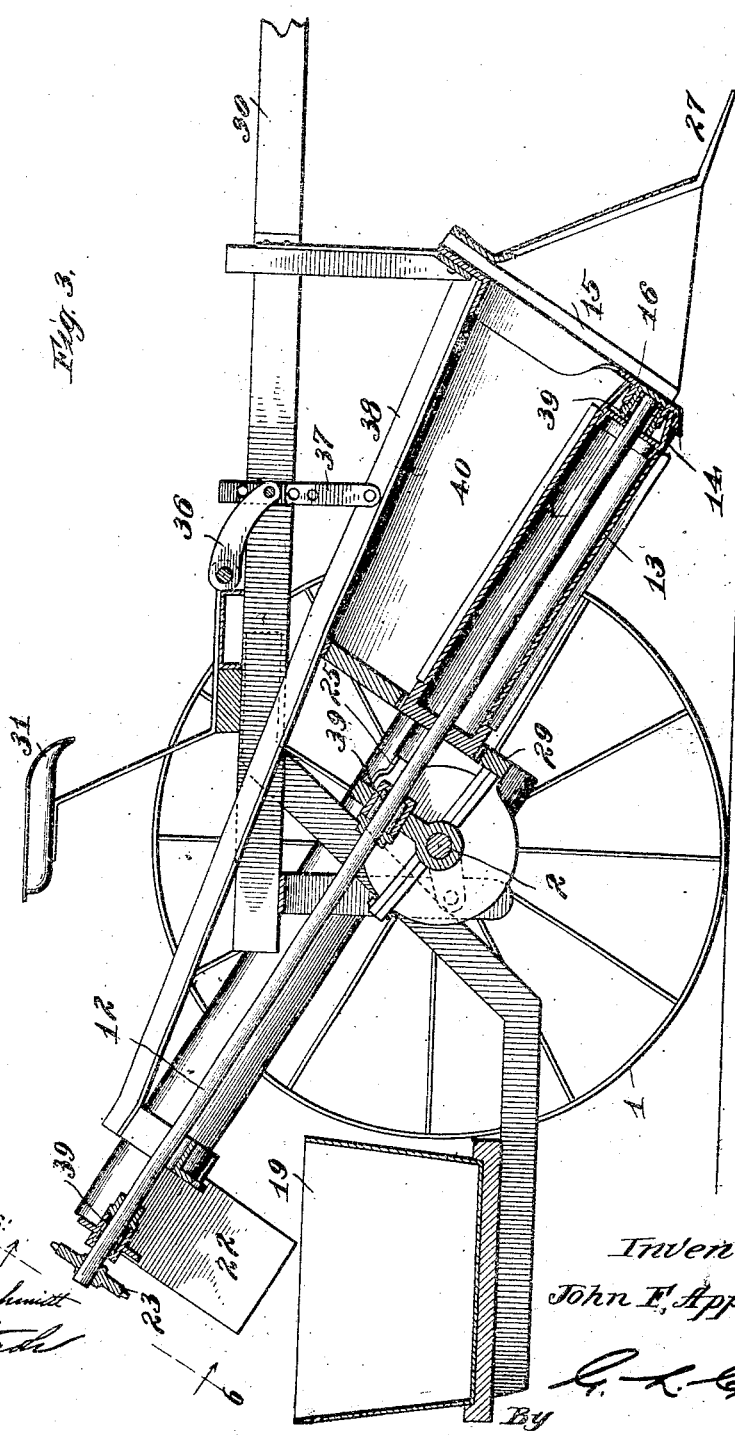

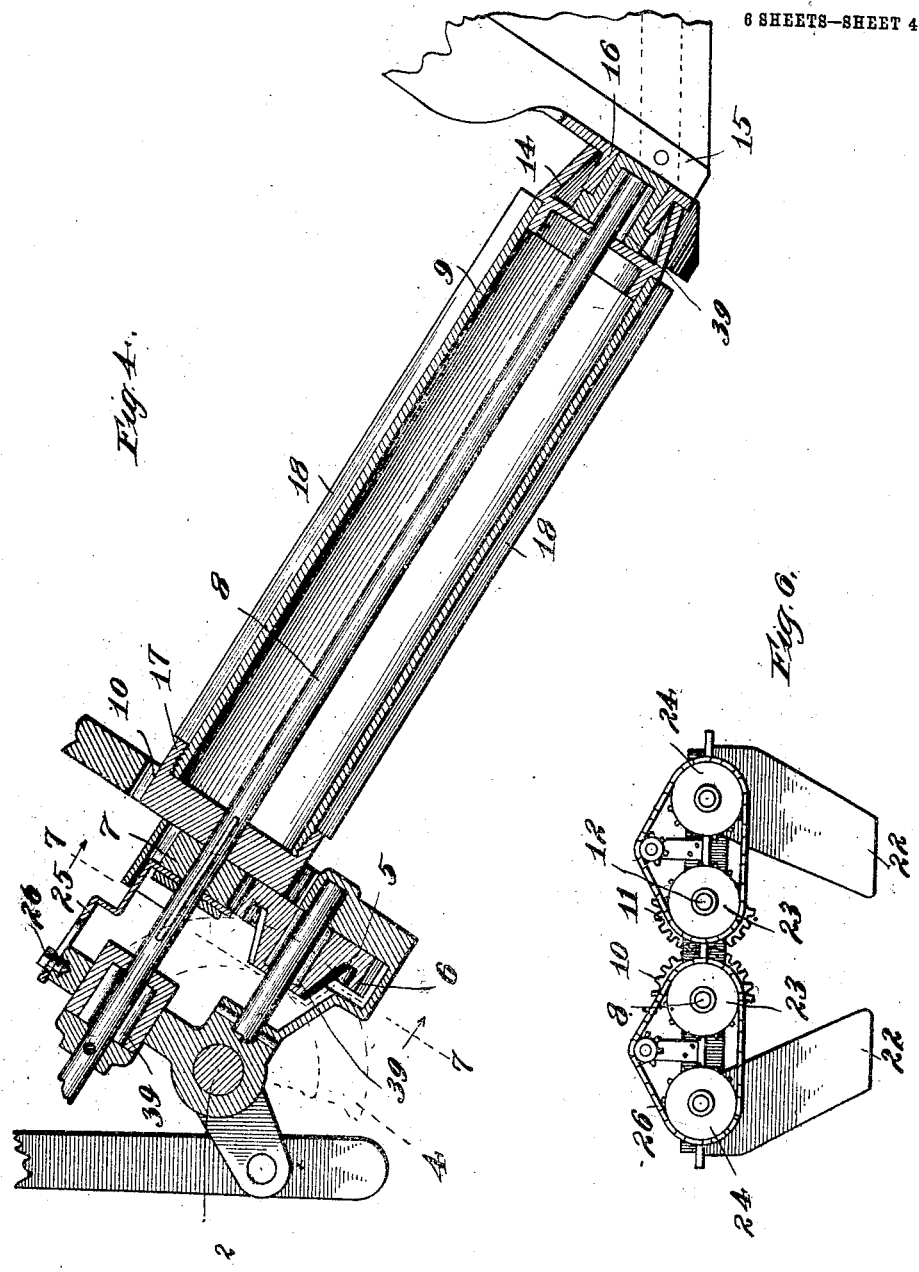

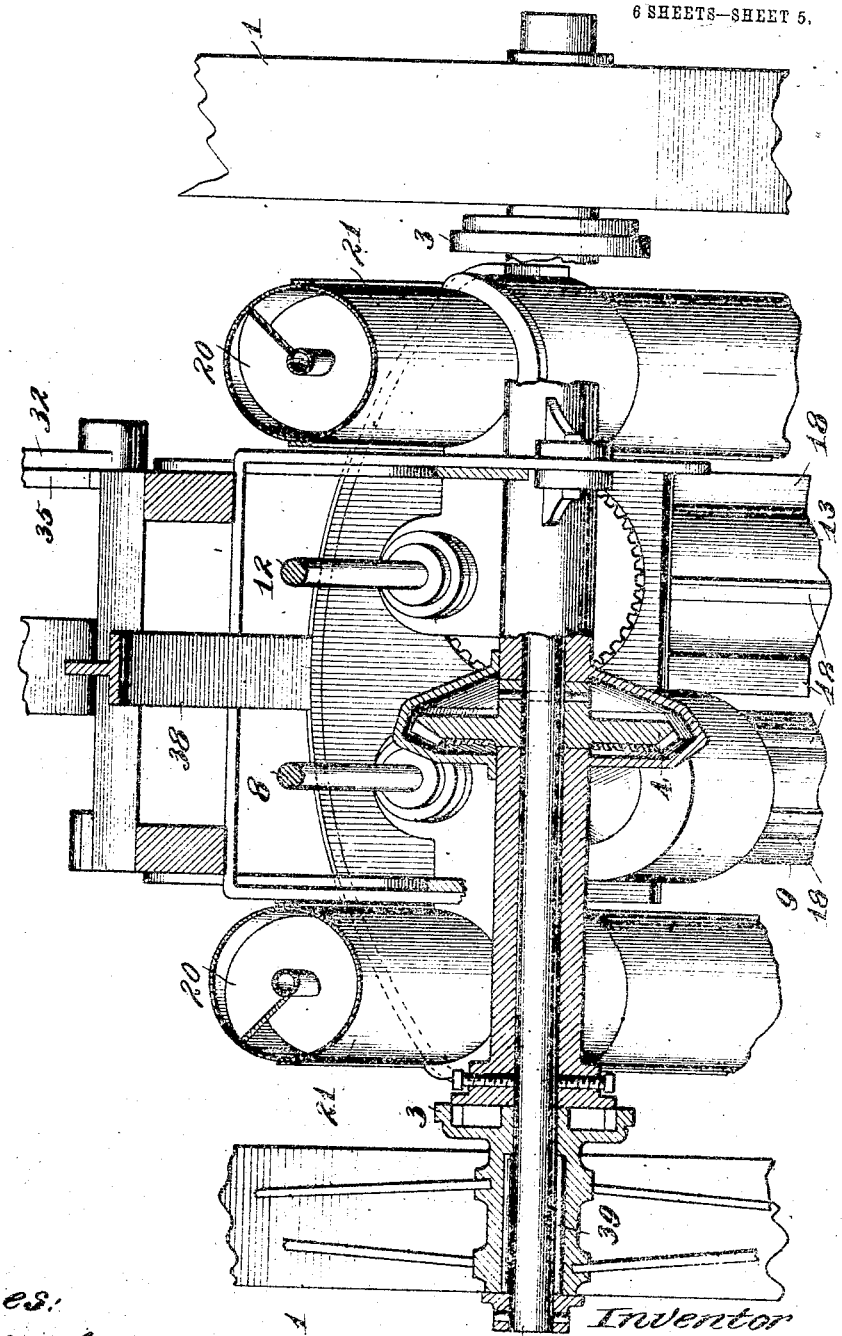

UNITED STATES PATENT OFFICE.

JOHN F. APPLEBY, OF LORENA, OKLAHOMA.

COTTON-BOLL GATHERER.

No. 908,637.   Specification of Letters Patent.   Patented Jan. 5, 1909.

Application filed November 30, 1907. Serial No. 404,570.

*To all whom it may concern:*

Be it known that I, JOHN F. APPLEBY, a citizen of the United States, residing at Lorena, in the county of Beaver and State of Oklahoma, have invented a certain new and useful Improvement in Cotton-Boll Gatherers, of which the following is a full, clear, concise, and exact description, reference being had to the accompanying drawings, forming a part of this specification.

My invention relates to cotton boll gatherers, and has for its object the provision of a machine which is well adapted to gather cotton bolls from cotton plants.

The machine of my invention is designed to be used after a cotton harvesting machine has passed over a cotton field, whereby the empty bolls may be gathered for commercial purposes.

The material of the cotton bolls is particularly well adapted for use in the formation of fibrous pulp from which paper and other commodities may be manufactured.

The machine of my invention is well adapted to removing the cotton bolls from the cotton plants without removing in material quantity the leaves or twigs of the plants.

In practicing my invention I employ as a boll gathering element, a rotating body which is feathered longitudinally of its axis of rotation, there being another body between which and the said rotating body the cotton plants may be confined, as the machine is traveling through the field. This other body is desirably a body which is similar in construction to the feathered rotating body, so that each feathered rotating body acts as a resisting agency in coöperation with the other rotating body to effect the removal of the bolls from the plants. The rotating bodies are desirably in the form of cylinders. The cylinders are inclined downwardly toward the front of the machine, so that the front portions of the cylinders are close to the ground and the upper portions of the cylinders are further removed from the ground, whereby bolls may be gathered from cotton plants varying in height and throughout the plants. The feathers upon each cylinder desirably interleave or intermesh with the feathers upon the companion cylinder, so that all bolls are forced to come into contact with boll gathering feathers, whereby the removal of all the bolls from the field over which the machine is passing is assured. A conveying device is desirably provided upon each side of a boll gathering roller to receive the removed bolls and to convey the same to a receiving basket that is carried upon the machine. The mechanism of the boll gatherer is desirably driven by the traction wheels which carry the same. The interrelation between the traction wheels, the boll gathering rollers and the conveying devices will be fully explained by reference to the accompanying drawings, showing the preferred embodiment of my invention, and other characteristics of my invention will also be pointed out in connection with the said drawings.

In the drawings—Figure 1 is a plan view of the machine of my invention. Fig. 2 is a sectional view in elevation on line 2 2 of Fig. 1. Fig. 3 is a sectional view in elevation on line 3 3 of Fig. 1. Fig. 4 is a sectional view in elevation of a part of the mechanism on line 4 4 of Fig. 1. Fig. 5 is a sectional view on line 5 5 of Fig. 2. Fig. 6 is a view taken in the direction of the arrows 6 of Fig. 3, certain parts of the mechanism to the rear of the parts shown in Fig. 6 being omitted for the sake of clearness. Fig. 7 is a view on line 7 7 of Fig. 4. Fig. 8 is a view on line 8 8 of Fig. 2.

Like parts are indicated by similar characters of reference throughout the different figures.

The mechanism of my invention desirably includes two traction wheels 1, 1, which preferably are the only traction wheels in the organization. These traction wheels are free to rotate upon the main shaft 2 of the machine in so far as such rotation will be permitted by means of the well-known clutching devices 3 which are provided, as is well understood, for the purpose of permitting differential motion between the traction wheels, as in rounding corners or permitting the wheels freely to rotate upon the shaft in backing, the clutching devices 3 (Fig. 5) effecting a fixed relation between the wheels and the shaft when the machine is being pulled forwardly in a straight line. It is unnecessary to furnish a detail description or illustration of these clutching devices, as their function, construction and purpose is well understood by those skilled in the art.

The main gear element which operates the mechanism of my invention is desirably in the form of a bevel gear wheel 4 (Figs. 4, 5 and 7) which meshes with a bevel pinion 5, the bevel pinion 5 being desirably in fixed mechanical relation with a spur gear 6, which, in turn, is in mesh with a spur pinion 7 splined upon a shaft 8 fixed with respect to a boll gathering roller 9, whose construction will be hereinafter more fully set forth. A spur gear 10 is also splined upon the shaft 8 and is in mesh with a spur gear 11 which is splined upon a shaft 12 that carries the other boll gathering roller 13, whose construction is desirably similar to the construction of the boll gathering roller 9. The boll gathering rollers are thus caused to rotate in opposite directions, as indicated by the arrows in Fig. 8, the upper portions of the peripheries of the rollers moving away from each other, while the lower portions of the peripheries of the rollers move toward each other. The cylinder of each roller is preferably formed of tubing, as indicated most clearly in Fig. 4, the lower end of each tube forming each cylinder being closed by a cap 14 which is constructed to constitute the journal end of its roller, the vehicle being provided with a downwardly projecting support 15 that carries a bearing 16 for the lower end of each boll gathering roller. The upper end of each tube of each boll gathering roller is closed by means of the associate spur gear 10 or 11 which is provided with an annular threaded extension 17 having threaded engagement with an exterior threaded portion of the upper end of the tube.

A number of feathers 18 are distributed about each roller, these feathers, in the embodiment of the invention shown, being separately formed from the cylinders of the rollers and bolted thereto. I prefer to employ four feathers which project from the roller cylinders in radial directions and which desirably occupy planes that are parallel with or include the axes of the rollers. The feathers 18 of one roller are in interleaving or intermeshing relation with the feathers of the other roller, whereby the feathers of one roller are brought in opposition to the cylindrical portions of the other roller when said feathers occupy horizontal positions, as illustrated in Fig. 8. Where the rollers are close enough together, the feathers desirably project more than half way across the space intervening between the rollers, so that the plants are engaged and bent by the feathers so as to insure the contact of all of the bolls in the plants with the feathers, whereby all of the bolls are bound to be removed. It will be observed that the cylindrical portion of each roller acts as a resisting surface for the feathers of the companion roller, whereby the cotton plants are interposed between the feathers of each roller and a resisting surface of a companion roller, whereby as the rollers rotate upwardly at their adjacent peripheral portions, the removal of the bolls is assured. It will be apparent from the construction of my invention that none of the cotton plants is pinched as they might be if the device were brought into opposition, but that each feather acts without the immediate coöperation of another feather in pulling the bolls from the plants, each feather in thus pulling bolls from the plants acting in direct coöperation with the cylindrical portion of the roller presented to it.

In order to enable the machine of my invention to strip the bolls from cotton plants of varying heights, and in order that the cotton plants may be presented at the proper angle to the stripping feathers of the boll gathering rollers, I incline the boll gathering rollers downwardly toward the front of the machine. Furthermore, by inclining the rollers, all bolls upon the plants are brought into contact with the boll gathering feathers no matter what may be the distance of the bolls from the ground or the proximity of the bolls to the ground. By inclining the rollers as indicated, the trunks of main stalks of the cotton plants are presented at a proper angle to the boll gathering feathers, which angle is usually a right angle with respect to said feathers. This is the case, generally speaking, without regard to the height of the plant, and inasmuch as the lower portion of the boll gathering rollers are in juxtaposition with the lower portions of the cotton plants, it will be seen that as the machine is drawn over a row of cotton plants, that the feathers pass from the bottom to the top of each plant, thereby insuring the removal of all of the bolls from the plants. The removal of all of the bolls from the cotton plants is further assured by having the feathers project more than half way across the narrowest space between the boll gathering rollers, or, in other words, having the feathers interleave or intermesh, for thereby the stalks or trunks of the cotton plants are bent first in one direction and then in the other, as suggested by the dotted lines in the central portion of Fig. 8, so that not only are the bolls upon the sides of the plants presented to the rollers bound to be removed, but the bolls that are at the front and rear of the plants are also bound to be removed. I desirably cause the bolls which have been gathered to be discharged into a receptacle carried by the vehicle, such a receptacle being indicated in the form of a basket 19.

I interpose conveying mechanism for transferring the bolls from the boll gathering rollers to the receptacle 19, this conveying mechanism, in the embodiment of the invention shown, residing in oppositely rotating conveying screws 20 which are disposed in suitable housings 21. These conveying screws desirably have the same inclination as do the boll gathering rollers, the conveying screw and boll gathering roller upon each side of the machine rotating in the same direction. As the boll gathering feathers move upwardly after having gathered the bolls, they discharge the bolls toward the conveying screws, which are rotating to convey the bolls upwardly. The upper end of each housing for the conveying screws terminates in a discharge spout 22 located over the basket 19, the bolls finding their way through the housings and through the discharge spouts into the basket.

The same gearing which causes the rotation of the boll gathering rollers desirably also effects the rotation of the conveying screws, to which end I preferably employ the mechanism shown most clearly in Figs. 1, 2, 3 and 6, which mechanism includes a chain gear wheel 28 upon each boll gathering roller shaft, a chain gear wheel 24 upon each conveying screw shaft, and an endless chain 26 inclosing each pair of gear wheels 23 and 24. By this construction the conveying screw and boll gathering roller upon one side of the machine are caused to rotate in the same direction, which is also the case with respect to the conveying screw and boll gathering roller upon the other side of the machine.

When it is desired to prevent the boll gathering rollers and the conveying screws from being operated while the machine is traveling, the spur pinion 7 may be drawn out of mesh with the pinion 6, to which end said spur pinion is splined to its shaft 8 and is provided with an annular groove at its upper end, into which an adjustable fork 25 is inserted. A clamp bolt 26 passes through a slot in the adjusting fork. When this clamping bolt is fastened, the adjusting fork may be moved up or down, thereby throwing the spur pinion 7 out of or into mesh with the gear 6.

The machine is provided with two directing fenders 27, 28 at its forward end, whereby the cotton plants are gathered laterally and are guided into the space between the boll gathering rollers. The machine may be equipped with a draft tongue 30 so as to permit it to be drawn by a pair of horses, a seat 31 being conveniently disposed upon the vehicle for the driver.

I provide mechanism for adjusting the inclined position of the conveyers and boll gathering rollers, which mechanism is illustrated most clearly in Fig. 2, where I have shown an adjusting lever 32 having a grip 33 linked to a dog 34 adapted to interlock with the teeth of a locking quadrant 35. The lever 32 is in the form of a bell crank whose lower arm 36 is connected with a link 37 attached to a frame portion 38 which is fixed with respect to the housings for the conveying screws and the bearings for the boll gathering rollers. By moving the lever, the boll gathering rollers and the conveying screws may be elevated and lowered. I prefer to employ rollers 39 in the various bearings. A housing 40, made in hinge sections that meet at the upper central portion of the machine, is provided for the purpose of preventing the boll gathering feathers from casting the bolls beyond the conveyers.

In certain of the claims I refer to the boll gathering rollers as being inclined, by which I mean that they are inclined at an angle to the horizontal.

I have herein shown and particularly described the preferred embodiment of my invention, but it is obvious that many changes may be made in the embodiment of the invention shown without departing from the spirit of the invention, and I do not, therefore, wish to be limited to the precise construction illustrated, but,

Having thus described my invention, I claim as new and desire to secure by Letters Patent:—

1. A cotton boll gathering machine including two boll gathering rollers each extending at an angle to the horizontal provided with projections in the form of feathers disposed longitudinally of the rollers, said rollers being disposed to permit the cotton plants to pass therebetween, thereby to permit the projections to engage the bolls and remove the same from the plants, and mechanism for causing the rollers to rotate in opposite directions with the upper portions of the rollers moving away from each other, said projections intermeshing or interleaving as the rollers rotate, the body portion of each roller being close to the nearest projections upon the other roller, whereby the said body portion acts as a resisting surface against which the feather that is in the act of removing bolls may press the cotton plants.

2. A cotton boll gathering machine including two boll gathering rollers provided with projections in the form of feathers disposed longitudinally of the rollers, said rollers being disposed to permit the cotton plants to pass therebetween, thereby to permit the projections to engage the bolls and remove the same from the plants, and mechanism for causing the rollers to rotate in opposite directions with the upper portions of the rollers moving away from each other, said projections intermeshing or interleaving as the rollers rotate, the body portion of each roller being close to the nearest projections upon the other roller, whereby the said body portion acts as a resisting surface against which the feather that is in the act of removing bolls may press the cotton plants.

3. A cotton boll gathering machine including two boll gathering rollers each extending at an angle to the horizontal provided with projections, said rollers being disposed to permit the cotton plants to pass therebetween, thereby to permit the projections to engage the bolls and remove the same from the plants, and mechanism for causing the rollers to rotate in opposite directions with the upper portions of the rollers moving away from each other, said projections intermeshing or interleaving as the rollers rotate, the body portion of each roller being close to the nearest projections upon the other roller, whereby the said body portion acts as a resisting surface against which the projecting edge that is in the act of removing bolls may press the cotton plants.

4. A cotton boll gathering machine including two boll gathering rollers provided with projections, said rollers being disposed to permit the cotton plants to pass therebetween, thereby to permit the projections to engage the bolls and remove the same from the plants, and mechanism for causing the rollers to rotate in opposite directions with the upper portions of the rollers moving away from each other, said projections intermeshing or interleaving as the rollers rotate, the body portion of each roller being close to the nearest projections upon the other roller, whereby the said body portion acts as a resisting surface against which the projecting edge that is in the act of removing bolls may press the cotton plants.

In witness whereof, I hereunto subscribe my name this 27th day of November A. D., 1907.

JOHN F. APPLEBY.

Witnesses:
   G. L. CRAGG,
   L. G. STROH.